(12) United States Patent
Markel et al.

(10) Patent No.: US 7,790,816 B2
(45) Date of Patent: Sep. 7, 2010

(54) METHOD OF MAINTAINING HEAT TRANSFER CAPACITY IN A POLYMERIZATION REACTION SYSTEM

(75) Inventors: Eric J. Markel, Kingwood, TX (US); Agapios K. Agapiou, Humble, TX (US)

(73) Assignee: Univation Technologies, LLC, Houston, TX (US)

( * ) Notice: Subject to any disclaimer, the term of this patent is extended or adjusted under 35 U.S.C. 154(b) by 435 days.

(21) Appl. No.: 11/879,673

(22) Filed: Jul. 18, 2007

(65) Prior Publication Data

US 2008/0033121 A1 Feb. 7, 2008

Related U.S. Application Data

(60) Provisional application No. 60/835,659, filed on Aug. 4, 2006.

(51) Int. Cl.
C08F 2/00 (2006.01)
C08F 2/34 (2006.01)
B01J 19/00 (2006.01)

(52) U.S. Cl. .......................... 526/67; 526/68; 526/901; 528/484

(58) Field of Classification Search .................. 526/67, 526/68, 74, 901; 528/484
See application file for complete search history.

(56) References Cited

U.S. PATENT DOCUMENTS

| | | | | |
|---|---|---|---|---|
| 3,082,198 | A | 3/1963 | Klein | 260/94.9 |
| 3,431,279 | A | 3/1969 | Ehrhart | 260/340.2 |
| 3,919,185 | A | 11/1975 | Takebe et al. | 260/93.7 |
| 4,501,319 | A | 2/1985 | Edelman et al. | 165/84 |
| 5,026,795 | A | 6/1991 | Hogan | 526/74 |
| 5,034,480 | A | 7/1991 | Funk et al. | 526/74 |
| 5,034,481 | A | 7/1991 | Funk et al. | 526/74 |
| 5,166,279 | A | 11/1992 | Speakman | 526/97 |
| 5,264,505 | A | 11/1993 | Shimizu et al. | 526/62 |
| 5,410,002 | A | 4/1995 | Govoni et al. | 526/88 |
| 5,728,782 | A | 3/1998 | Brady et al. | 526/63 |
| 6,165,418 | A | 12/2000 | Anderson et al. | 422/109 |
| 6,180,738 | B1 | 1/2001 | Wang et al. | 526/200 |
| 6,372,868 | B1 | 4/2002 | Szul et al. | 526/114 |
| 6,562,924 | B2 | 5/2003 | Benazouzz et al. | 526/201 |
| 6,608,153 | B2 | 8/2003 | Agapiou et al. | 526/154 |
| 6,630,984 | B2 | 10/2003 | Bisschops | 355/30 |
| 6,639,028 | B2 | 10/2003 | Heslop et al. | 526/106 |
| 6,646,074 | B2 | 11/2003 | Herzog et al. | 526/152 |
| 6,753,390 | B2 * | 6/2004 | Ehrman et al. | 526/113 |
| 6,803,430 | B2 | 10/2004 | Agapiou et al. | 526/142 |
| 6,805,801 | B1 | 10/2004 | Humayun et al. | 210/663 |
| 6,887,957 | B2 | 5/2005 | Chabrand et al. | 526/144 |
| 6,894,127 | B2 | 5/2005 | Behue et al. | 526/90 |
| 6,939,980 | B2 | 9/2005 | Memita et al. | 554/170 |
| 6,946,530 | B2 | 9/2005 | Gallice et al. | 526/89 |
| 2004/0087743 | A1 | 5/2004 | Bai et al. | 526/74 |
| 2004/0225098 | A1 | 11/2004 | Kuhlberger et al. | 526/352 |
| 2005/0267267 | A1 | 12/2005 | Sandell et al. | 526/64 |
| 2006/0228088 | A1 | 10/2006 | Charlier De Chily et al. | 385/147 |

FOREIGN PATENT DOCUMENTS

| | | |
|---|---|---|
| CA | 2264463 | 9/2000 |
| EP | 0453116 | 4/1995 |
| EP | 0811638 | 12/1997 |
| EP | 1576857 | 9/2005 |
| WO | WO 96/11961 | 4/1996 |
| WO | WO 97/46599 | 12/1997 |
| WO | WO 98/12231 | 3/1998 |
| WO | WO 00/02931 | 1/2000 |
| WO | WO 01/44323 | 6/2001 |
| WO | WO 2004/066683 | 8/2004 |
| WO | WO 2004/103099 | 12/2004 |

OTHER PUBLICATIONS

Tiu, C., et al., *Friction Reduction and Heat Transfer Enhancement In A Plate Heat Exchanger*, Tenth Australian Chemical Engineering Conference, (1982), p. 304-307.

* cited by examiner

*Primary Examiner*—Fred M Teskin

(57) ABSTRACT

This invention relates to a process for maintaining heat transfer capacity of a cycle cooler while polymerizing olefin(s) in the presence of catalyst and a carboxylate metal salt by controlling the amount of carboxylate metal salt present in the reaction system. In particular, the invention relates to maintaining a cycle cooler performance parameter substantially constant while polymerizing olefin(s) in the presence of a carboxylate metal salt and a conventional-type transition metal polymerization catalyst compound, or a metallocene-type polymerization catalyst compound. This invention further relates to a process wherein the cycle cooler performance parameter is a heat transfer capacity of the cycle cooler, a pressure drop across the cooler, or a cooler approach temperature of a cycle cooler.

86 Claims, 2 Drawing Sheets

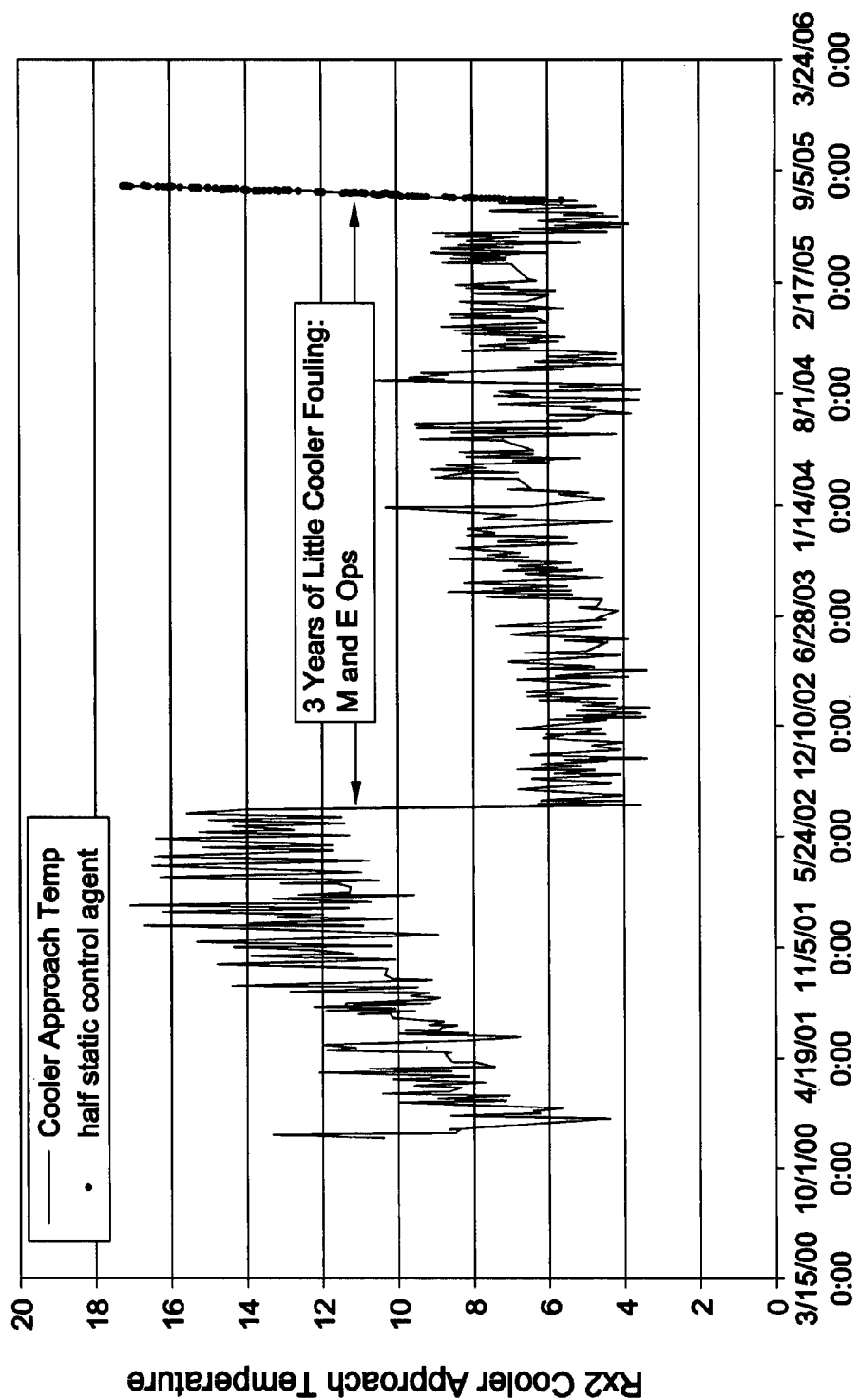

METHOD OF MAINTAINING HEAT TRANSFER CAPACITY IN A POLYMERIZATION REACTION SYSTEM

CROSS REFERENCE TO RELATED APPLICATIONS

This application claims the benefit of Ser. No. 60/835,659, filed Aug. 4, 2006, the disclosure of which is incorporated by reference in its entirety.

FIELD OF THE INVENTION

The present invention relates to a polymerization process operating with a cycle cooler and a method for maintaining heat transfer capacity of the cycle cooler. In particular, the invention is directed to a method for maintaining cycle cooler capacity in a reaction system while polymerizing with a metallocene-type catalyst system or a conventional-type transition metal catalyst system in the presence of a carboxylate metal salt.

BACKGROUND OF THE INVENTION

Polymerization processes are exothermic and require cooling to remove the heat of reaction. This cooling is typically accomplished by installing a cooler, typically referred to as a cycle cooler, in the process cycle. Production capacity over periods of operation can be adversely affected by a gradual decrease in the cooling capacity of a cycle cooler. The rate of loss in cooling capacity varies with processes, catalyst types, and unit configurations. The amount of loss that can be tolerated by the process also varies with catalyst type, reactor configurations, and process economics. Gas phase processes typically require very large cycle coolers, and are particularly sensitive to losses of cooler capacity. Some processes, such as processes using metallocene-type catalyst systems, are particularly sensitive to changes in cooling capacity.

The mechanisms for losses in cooling capacity vary. For example, particles of catalyst and/or resin may be carried into the cycle cooler and deposited on the process side (typically the inside) of the cooler tubes. These deposits not only restrict the flow of fluid, but also reduce the transfer of heat from the process fluid into the coolant. In liquid phase processes, some of the polymer may dissolve in the reactor diluent and redeposit on the metal heat exchanger surfaces.

Process operability problems beyond cooling capacity are also a major issue for polymer processes. For example, the tendency for a continuous gas phase or slurry phase process to form a blockage and/or sheet is a concern. Sheeting and/or static generation in a continuous gas phase process can lead to the ineffective operation of various reactor systems resulting in early reactor shutdown. In a continuous slurry process, polymer particles accumulating on the walls of the reactor, which act as a heat transfer surface, can result in operability problems. These polymer particles can continue to polymerize on the walls and can result in a premature reactor shutdown. These sheeting problems are referenced in some prior art as "fouling" of the system. "Fouling" in this context refers to physical blockage of material flow in or through the reactor vessel by sheets and agglomerates. This is a different problem from the term "fouling" of a process cooler. When the term "fouling" is applied to process coolers, it typically refers to the gradual loss of cooling capacity as a result of buildup of material on or in the cooler tubes. Thus, methods of preventing "fouling" in reactor vessels are typically not applicable to the prevention of "fouling" (loss of cooling capacity) in cycle coolers.

Advances in polymerization processes have addressed many reactor continuity problems. For example, U.S. Pat. No. 6,608,153, and 6,630,984 are directed to adding a carboxylate metal salt into the reaction system to reduce static or sheeting and thus improve process continuity. In addition, U.S. Pat. Nos. 6,803,430, 6,946,530, 6,894,127, 6,646,074, 6,639,028, 6,562,924, 6,887,957, 6,180,738, and U.S. Patent Publ. No. 20040087743 discuss polymerization using various additives and techniques to reduce sheeting and improve reactor continuity; U.S. Pat. Nos. 5,264,505, and 5,728,782 discuss methods to reduce cooler or other fouling in processes; CHEMECA 82 [Eighty-Two]: Resour. Dev. Eighties, Aust. Chem. Eng. Conf., 10th (1982), 304-7. Inst. Eng. Aust.: Barton, Australia discusses the addition of Polyox WSR-301 to reduce the friction in plate heat exchangers; and U.S. Pat. Nos. 5,166,279 and 6,165,418 and U.S. Patent Publ. No. 20040225098, discuss polymer processes.

For example, antistatic agents, such as, carboxylate acids, and/or metal salts have been used to reduce the amount of sheet and agglomerate formation in the polymerization reactor. In particular, EP-A1 0 453 116 published Oct. 23, 1991 discusses the introduction of antistatic agents to the reactor for reducing sheeting and agglomerate formation; U.S. Pat. No. 5,026,795 discusses the addition of an antistatic agent with a liquid carrier to the polymerization zone in the reactor; U.S. Pat. No. 5,410,002 discusses using a conventional Ziegler-Natta titanium/magnesium supported catalyst system where a selection of antistatic agents are added directly to the reactor to reduce sheeting and agglomeration; U.S. Pat. Nos. 5,034,480 and 5,034,481 discuss a reaction product of a conventional Ziegler-Natta titanium catalyst with an antistat to produce ultrahigh molecular weight ethylene polymers; U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; U.S. Pat. No. 3,919,185 describes a slurry process using a nonpolar hydrocarbon diluent using a conventional Ziegler-Natta-type or Phillips-type catalyst and a polyvalent metal salt of an organic acid having a molecular weight of at least 300; and PCT Publication WO 97/46599 published Dec. 11, 1997 discusses feeding an unsupported, soluble metallocene-type catalyst system and injecting antifoulants or antistatic agents into the reactor.

Others have discussed modifying the catalyst system to improve process operability. Examples of these include: WO 96/11961 published Apr. 26, 1996 discusses as a component of a supported catalyst system and antistatic agent for reducing sheeting in a gas, slurry or liquid pool polymerization process; and EP-A2-811 638 discusses using a metallocene catalyst and an activating cocatalyst in a polymerization process in the presence of a nitrogen containing antistatic agent.

Background references include: WO 1998/12231, WO 2000/02931, WO 2001/44323, WO 2004/103099; EP 1 576 857; CA 2264463; U.S. Pat. Nos. 6,939,980, 6,805,801, 6,372,868, 4,501,319, and 3,431,279; U.S. Patent Application Publication No. 2005/267267.

The collective effect of process improvements has resulted in the capability to operate polymerization processes for extended periods of time without shutting down the processes due to unplanned process interruptions or maintenance of the system. However, cycle coolers continue to lose cooling capability over time. Thus, at some point a unit must be shutdown and the cycle cooler must be cleaned to restore the original cooling capacity of the system. Valuable production operating time is lost while the unit is shut down for cooler cleaning. Furthermore, the costs and/or amount of downtime required to clean a cycle cooler can be significant.

Maintaining cooling capacity (prevention of losses in cooling capacity) is typically addressed by various mechanical designs. For example, a cycle cooler will be designed with a specific material, velocity, or flow pattern to minimize plugging and the resulting loss of cooling. Process operating conditions can also be controlled to prevent cycle cooler pluggage. For example, the temperature of the cooling medium may be controlled to control tube wall temperatures in a desired range. However, the past endeavors have failed to improve cycle cooler life to keep up with current extended operating capabilities. With the extended operating time, cycle cooler pluggage and loss of cooling capacity remains a concern in polymerization processes.

Thus, it would be advantageous to have a polymerization process capable of operating continuously while maintaining peak cooling capacity. In other words, it would also be highly beneficial to have a continuously operating polymerization process that does not lose a significant amount of cooling capacity over time.

SUMMARY OF THE INVENTION

This invention provides a process for maintaining the heat transfer performance of a cycle cooler while polymerizing olefin(s) in the presence of catalyst. The process comprising the steps of: introducing a polymerization catalyst and a carboxylate metal salt into a reaction system, preferably comprising a Group 13 metal atom, into a reaction system; reacting at least one type of olefin with the polymerization catalyst; transferring a heat of reaction to a cycle fluid; removing at least a portion of the heat of reaction from the cycle fluid in a cycle cooler; and controlling the amount of the carboxylate metal salt introduced such that a cycle cooler performance parameter is substantially constant over a period of time of operation. In some embodiments, the cycle cooler performance parameter can be a heat transfer capacity of the cycle cooler, a pressure drop across the cycle cooler at substantially similar conditions, or a cooler approach temperature.

In one preferred embodiment, the carboxylate metal salt is aluminum mono-stearate, aluminum di-stearate, aluminum tri-stearate, or a combination thereof. The amount of carboxylate metal salt introduced is as a ratio of the weight of carboxylate metal salt fed to weight of polymerized resin produced and is from about 1 to about 500 PPM, preferably from about 1 to about 100 PPM, and more preferably from about 1 to about 50 PPM. In another embodiment, the amount of the carboxylate metal salt introduced is based on a weight percent of polymerization catalyst introduced and is in the range of from about 0.5 to about 100 weight percent.

In one embodiment, the carboxylate metal salt is fed separately from the catalyst. In another embodiment, the carboxylate metal salt and the polymerization catalyst are fed as a mixture.

In yet another embodiment of the invention, the cycle cooler performance parameter is the heat transfer capacity of the cycle cooler, wherein the heat transfer capacity of the cycle cooler does not decrease by more than about 10%, preferably does not decrease by more than about 5%, and even more preferably does not decrease by more than about 3% over a period of time of operation. In a preferred embodiment, the period of time of operation is greater than about one month. Preferably greater than about one year, and even more preferably is about six months to about three years.

One preferred embodiment comprises a conventional-type transition metal polymerization catalyst compound, or more preferably a metallocene-type polymerization catalyst compound.

This invention also provides a process for maintaining a cycle cooler performance parameter of a cycle cooler while feeding a carboxylate metal salt separately from a polymerization catalyst. The process comprising the steps of: introducing a polymerization catalyst into a reaction system; introducing a carboxylate metal salt preferably comprising a Group 13 metal atom, into the reaction system separately from the polymerization catalyst; reacting at least one type of olefin with the polymerization catalyst; transferring a heat of reaction to a cycle fluid; removing at least a portion of the heat of reaction from the cycle fluid in the cycle cooler; and controlling the amount of the carboxylate metal salt introduced such that a cycle cooler performance parameter is substantially constant over a period of time of operation. In a preferred embodiment, the cycle cooler performance parameter is a heat transfer capacity of the cycle cooler, a pressure drop across the cycle cooler at substantially similar conditions, or a cooler approach temperature.

In one embodiment, the cycle cooler performance parameter is the pressure drop across the cycle cooler at substantially similar process conditions, and the amount of the carboxylate metal salt introduced is controlled such that the pressure drop across the cycle cooler at substantially similar process conditions does not increase by more than about 100% over the period of time of operation, preferably the pressure drop across the cycle cooler at substantially similar process conditions does not increase by more than about 50% over the period of time of operation, and more preferably the pressure drop across the cycle cooler at substantially similar process conditions does not increase by more than about 20% over the period of time of operation.

In another embodiment, the cycle cooler performance parameter is the cooler approach temperature and the amount of the carboxylate metal salt introduced is controlled such that the cooler approach temperature does not increase by more than about 150% over the period of time of operation, preferably the cooler approach temperature does not increase by more than about 100% over the period of time of operation, and more preferably the cooler approach temperature does not increase by more than about 50% over the period of time of operation.

This invention also provides a continuous gas phase polymerization process for polymerizing ethylene and one or more alpha-olefins having 4 or more carbon atoms at a pressure in the range of from about 100 psig to about 500 psig, a polymerization temperature in the range of from about 30° C. to about 120° C., and at a polymerization catalyst productivity of greater than 1000 grams of the polymer product per gram of the polymerization catalyst, the process operating in the presence of a carboxylate metal salt, wherein the carboxylate metal salt comprises a Group 13 metal atom, and wherein the amount of carboxylate metal salt introduced is controlled such that a heat transfer capacity of the cycle cooler is substantially constant over a period of time of operation. In other preferred embodiments, the catalyst productivity is greater than 1500 grams of the polymer product per gram of the polymerization catalyst, and preferably greater than 2000 grams of the polymer product per gram of the polymerization catalyst.

BRIEF DESCRIPTION OF THE DRAWINGS

FIG. 2 illustrates the loss of cooling capacity of a commercial scale cycle cooler as evidenced by an increase in cooler approach temperature when the amount of carboxylate metal salt fed to the reactor is reduced.

DETAILED DESCRIPTION OF THE INVENTION

Figure 1:
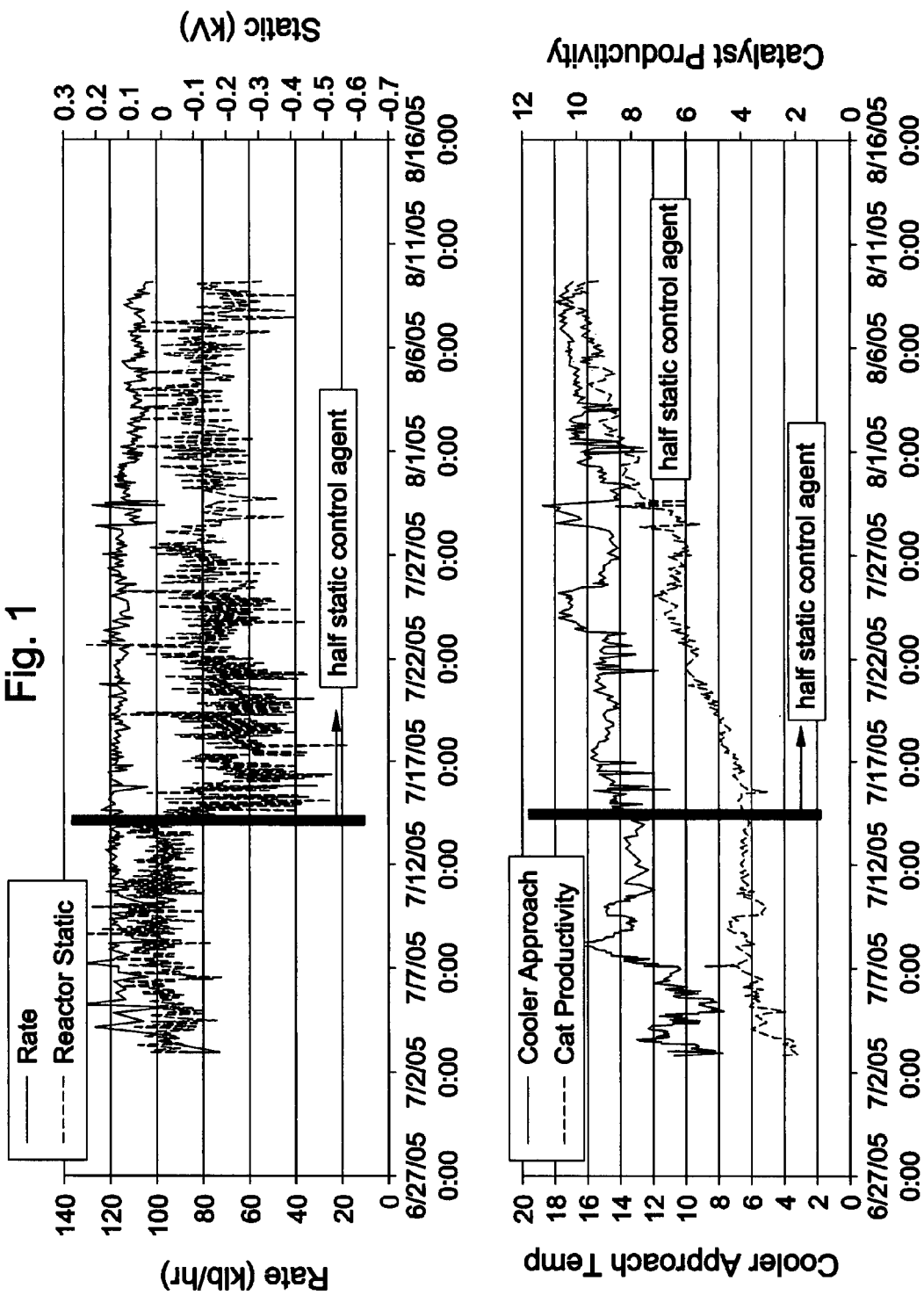
FIG. 1 shows five years of cooler approach temperature data for a commercial scale cycle cooler, showing a three year period of substantially constant cooler approach temperature.

The invention is directed toward a method for maintaining a cycle cooler performance parameter substantially constant while polymerizing olefin(s) in the presence of a polymerization catalyst and a carboxylate metal salt. The invention further relates to a polymerization process having improved operability while polymerizing ethylene and one or more alpha-olefins. It has been surprisingly discovered that feeding a carboxylate metal salt, particularly a carboxylate metal salt comprising a group 13 metal, substantially improves the ability to operate the polymerization process over extended periods of time. Particularly surprising is the finding that feeding the carboxylate metal salt significantly improves the cooling life of a cycle cooler, as evidenced by monitoring a cycle cooler performance parameter, and even more so where the amount of carboxylate metal salt fed is controlled to maintain a minimum feed rate or concentration in the reaction system.

Furthermore, it is unexpected that polymers could be produced in a polymerization process over extended periods of time using the polymerization catalyst and carboxylate metal salt combination without adversely affecting a cycle cooler performance parameter such as cycle cooler heat transfer capacity, cooler approach temperature, or cooler pressure drop if a minimum amount of carboxylate metal salt feed is maintained. This discovery is important in that, from a process operability standpoint, some types of polymers are difficult to produce without maintaining maximum cooling capacity.

Production capacity for a polymerization reactor is often limited by the ability to remove the heat generated by the exothermic reactions. Large industrial heat exchangers, referred to herein as cycle coolers, are used to remove the heat generated in the polymerization reactor. Cycle fluid heated by the polymerization reaction typically exits the reactor and is cooled in the cycle cooler and returned to the reactor. The cycle fluid cools the exothermic reaction and often provides a mixing or fluidization function of the polymer inside the reactor.

In one embodiment of the invention, the reaction system is a gas phase reaction system comprising a reaction vessel, a cycle cooler, and a cycle compressor. The gas phase reactor of this embodiment has a distributor plate in the lower portion of the reactor vessel. Gas flows up through a bed of resin, fluidizing the bed, and exits out the top of the reactor vessel. The gas then flows through a cycle compressor and a cycle cooler and returns to the bottom of the reactor vessel. In other embodiments, the reaction system can have more than one cycle cooler, or different arrangements of cycle coolers.

In gas phase processes, a particularly useful method to cool a reaction is to adjust the composition of the cycle fluid in the reactor such that a portion will be condensed to form liquid when it is cooled in the heat exchanger. The resulting mixture of gas and liquid provides significantly higher cooling capacity (per pound of gas removed from the reactor) than conventional "dry-mode" operation. Operation in condensing mode, as described in U.S. Pat. Nos. 4,543,399, 4,588,790, 5,342,749, 5,405,922, and 5,436,304, provides state-of-the-art high production capacities in gas phase processes. Maintaining cooling capacity is particularly important when operating with high levels of condensing.

In a commercial setting, a cycle cooler performance parameter is often linked to lost economic value. For example, measured production rate drop is a useful method. More sensitive, pro-active measures of heat exchanger fouling include deteriorating heat transfer coefficient, high pressure drop across the exchanger, and rising cooler approach temperature (the difference between process-side outlet temperature and exchanger coolant supply temperature). While these measures can vary with process variables such as process fluid flow rate, production rate, condensed levels, etc, those skilled in the art can account for these variables and determine cooling capacity relative to a clean exchanger.

Feeding an amount of the carboxylate metal salt described below in combination with various polymerization catalysts results in a substantial improvement in process operability by maintaining the performance of the cycle cooler as indicated by cycle cooler performance parameters, such as the cooling capacity of the cycle cooler, an increase in cycle cooler pressure drop, or increase in cycle cooler approach temperature without adverse effect on the physical polymer properties, and the capability to produce a broader range of polymers over an extended period of time of operation.

In one embodiment, the invention is directed to a process for maintaining a cooler performance parameter while polymerizing an olefin or olefins in the presence of a catalyst. In this embodiment, a polymerization catalyst and a carboxylate metal salt, preferably comprising a Group 13 metal atom, are introduced into a reaction system that includes a reactor vessel and a cycle cooler. The polymerization catalyst reacts with at least one type of olefin under polymerization conditions in the reactor vessel. This reaction creates heat, which is transferred to a cycle fluid to cool the reacting particles. This heat of reaction is then removed in the cycle cooler. In a preferred embodiment, the amount of the carboxylate metal salt introduced is controlled such that a cycle cooler performance parameter is substantially constant over a period of time of operation.

For the purposes of this patent specification and appended claims the term "cycle cooler" refers to any cooler in the process that removes at least a portion of the heat of reaction from the process. This invention is applicable to any cooler configuration, such as shell and tube, plate and frame, or other designs. In one embodiment, the cycle cooler is a shell and tube cycle cooler in a gas phase reaction system. The cycle cooler can be external to the reactor vessel and can be mounted vertically or horizontally. The reaction system can have a single cycle cooler, or multiple cycle coolers. Multiple cycle coolers may be in series or parallel. Furthermore, cycle coolers can be mounted upstream or down stream of a cycle compressor or cycle pump.

Furthermore, for the purposes of this patent specification and appended claims the term "cycle cooler performance parameter" refers to any process parameter used to monitor the condition of the cycle cooler. In one preferred embodiment, the cycle cooler performance parameter is a parameter that correlates with the heat transfer capabilities of the cycle cooler. One of ordinary skill in the art can determine the heat transfer capacity of a cycle cooler using conventional heat transfer and physical property methods. In another embodiment, the cycle cooler performance parameter is a heat transfer capacity of the cycle cooler, a pressure drop across the cooler (on the process side), or a cooler approach temperature.

The cycle cooler can be a heat exchanger, which is typically, but not necessarily, external to the reaction vessel. In a typical process, a cycle fluid, which can be a liquid, a gas, or a combination of liquid and gas, flows through or circulates in the reaction vessel. While circulating through the reaction vessel, the cycle fluid contacts the reacting catalyst and catalyst/resin particles. Heat generated by the exothermic reaction is transferred to the cycle fluid. The heated cycle fluid then contacts the heat exchanger wherein the heat is transferred to a cooling fluid, which can be a liquid or a gas. The cooled cycle fluid is then returned to the reaction vessel to repeat the process. The cycle cooler may be a heat exchanger that is incorporated into the reaction "loop" wherein catalyst, resin particles, and cycle fluid all pass through the cycle cooler.

For the purposes of this patent specification and appended claims the term "carboxylate metal salt" is any mono- or di- or tri-carboxylic acid salt with a metal portion from the Periodic Table of Elements. Non-limiting examples include saturated, unsaturated, aliphatic, aromatic or saturated cyclic carboxylic acid salts where the carboxylate ligand has preferably from 2 to 24 carbon atoms, such as acetate, propionate, butyrate, valerate, pivalate, caproate, isobuytlacetate, t-butyl-acetate, caprylate, heptanate, pelargonate, undecanoate, oleate, octoate, palmitate, myristate, margarate, stearate, arachate and tercosanoate. Non-limiting examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

The carboxylate metal salt of the current invention is represented by the following general formula:

i. $MQ_x(OOCR)_y$                                           (I)

where M is a metal from Groups 1 to 16 and the Lanthanide and Actinide series, preferably from Groups 1 to 7 and 13 to 16, more preferably from Groups 3 to 7 and 13 to 16, even more preferably Groups 2 and 13, and most preferably Group 13; Q is halogen, hydrogen, a hydroxy or hydroxide, alkyl, alkoxy, aryloxy, siloxy, silane sulfonate group or siloxane; R is a hydrocarbyl radical having from 2 to 100 carbon atoms, preferably 4 to 50 carbon atoms; and x is an integer from 0 to 3 and y is an integer from 1 to 4 and the sum of x and y is equal to the valence of the metal. In a preferred embodiment of the above formula (I) y is an integer from 1 to 3, preferably 1 to 2, especially where M is a Group 13 metal.

Non-limiting examples of R in the above formula (I) include hydrocarbyl radicals having 2 to 100 carbon atoms that include alkyl, aryl, aromatic, aliphatic, cyclic, saturated or unsaturated hydrocarbyl radicals. In an embodiment of the invention, R is a hydrocarbyl radical having greater than or equal to 8 carbon atoms, preferably greater than or equal to 12 carbon atoms and more preferably greater than or equal to 17 carbon atoms. In another embodiment R is a hydrocarbyl radical having from 17 to 90 carbon atoms, preferably 17 to 72, and most preferably from 17 to 54 carbon atoms.

Non-limiting examples of Q in the above formula (I) include one or more, same or different, hydrocarbon containing group such as alkyl, cycloalkyl, aryl, alkenyl, arylalkyl, arylalkenyl or alkylaryl, alkylsilane, arylsilane, alkylamine, arylamine, alkyl phosphide, alkoxy having from 1 to 30 carbon atoms. The hydrocarbon containing group may be linear, branched, or even substituted. Also, Q may be an inorganic group such as a halide, sulfate or phosphate.

In preferred embodiments, M is a metal from Group 13; Q is halogen or a hydroxy group; and R is a hydrocarbyl radical having from 4 to 24 carbon atoms.

In other preferred embodiments, M is a metal from Group 13; Q is a hydroxy group; y is either 1, 2 or 3; and R is a hydrocarbyl radical having greater than 12 carbon atoms.

Preferred carboxylate metal salts are those aluminum carboxylates such as aluminum mono, di- and tri- stearates, aluminum octoates, oleates and cyclohexylbutyrates, or combinations thereof. In a more preferred embodiment, the carboxylate metal salt is $(CH_3(CH_2)_{16}COO)_3Al$, an aluminum tri-stearate (preferred melting point 115° C.), $(CH_3(CH_2)_{16}COO)_2$—Al—OH, a aluminum di-stearate (preferred melting point 145° C.), a $CH_3(CH_2)_{16}COO$—Al(OH)$_2$, an aluminum mono-stearate (preferred melting point 155° C.), or combinations of the above.

Non-limiting commercially available carboxylate metal salts for example include Witco Aluminum Stearate #18, Witco Aluminum Stearate #22, Witco Aluminum Stearate #132 and Witco Aluminum Stearate EA Food Grade, all of which are available from Chemtura Corporation, Memphis, Tenn.

Preferred carboxylate metal salts have a melting point from about 30° C. to about 250° C., more preferably from about 37° C. to about 220° C., even more preferably from about 50° C. to about 200° C., and most preferably from about 100° C. to about 200° C. In one preferred embodiment, the carboxylate metal salt is an aluminum stearate having a melting point in the range of from about 135° C. to about 165° C. In another preferred embodiment the carboxylate metal salt has a melting point greater than the polymerization temperature in the reactor.

Other examples of carboxylate metal salts include titanium stearates, tin stearates, calcium stearates, zinc stearates, boron stearate and strontium stearates.

The carboxylate metal salt may be combined with anti-static agents such as fatty amines, for example, Kemamine AS 990/2 zinc additive, a blend of ethoxylated stearyl amine and zinc stearate, or Kemamine AS 990/3, a blend of ethoxylated stearyl amine, zinc stearate and octadecyl-3,5-di-tert-butyl-4-hydroxyhydrocinnamate. Both these blends are available from Chemtura Corporation, Memphis, Tenn. Furthermore, it is believed that AS 990/2 or AS 990/3 may be used alone in the place of the carboxylate metal salt to achieve the claimed effects of the current invention.

As previously stated, production capacity for a polymerization reactor is often limited by the ability to remove the heat generated by the exothermic reactions. It is also well known that cycle coolers designed to remove this heat of reaction lose heat transfer capability (sometimes referred to as "cooler fouling"). It was surprisingly discovered that controlling the level of carboxylate metal salt effects the rate of "cooler fouling." Particularly surprising is that controlling the level of carboxylate metal salt to maintain a minimum amount of carboxylate metal salt present in the process reduces or substantially eliminates cycle cooler fouling. As previously discussed, "cycle cooler fouling" is different from "fouling" of the reactor vessel or cycle cooler inlet by sheets and agglomerates. For the purposes of this patent specification "cooler fouling or cycle cooler fouling" refers to the loss of heat transfer capability, increase in cooler pressure drop, increase in cooler approach temperature, or a detrimental effect on other heat transfer parameter(s), typically caused by the formation of a film or deposits in the passages of the cycle cooler.

The minimum level of carboxylate metal salt required depends on the particular reactor type, configuration, polymerization catalyst being used, and/or product being produced. This minimum level can be determined by one of ordinary skill in the art without undue experimentation by operating the process with various levels of carboxylate metal salt in the system while monitoring one or more cycle cooler performance parameters. In one embodiment, the amount of the carboxylate metal salt introduced is a ratio of the weight of carboxylate metal salt fed to the reactor to the weight of polymerized resin being produced in the reactor and is in the range of from about 1 to about 500 PPM. In other embodiments, this weight ratio is in the range of from about 1 to about 100 PPM, or preferably from about 1 to about 50 PPM. In yet another embodiment, the amount of the carboxylate metal salt fed to the reactor is based on a weight of polymerization catalyst fed to the reactor and is in the range of from about 0.5 to about 100 weight percent.

In one embodiment, the amount of the carboxylate metal salt introduced is controlled such that a cycle cooler performance parameter remains substantially constant over a period of time of operation. As used herein, "a period of time of operation" can be any period of operating time, preferably an extended period of time during which the process is operated. The period of time of operation can be the period of operating time from when a new cooler is installed or the existing cooler is cleaned and when the cycle cooler is changed or cleaned again. The period of time of operation over which the cycle cooler heat transfer capacity is maintained depends on the particular reactor type, configuration, polymerization catalyst being used, and/or product being produced. In one embodiment, the cycle cooler performance parameter is substantially constant over a period of time of operation that is greater than about one month, preferably greater than about one year, and more preferably about six months to about three years. In another embodiment, the cycle cooler performance parameter is substantially constant over a period of time of operation of about six months, more preferably about one year, even more preferably two years, and more preferably yet about three years.

As used herein, "substantially constant" means that the parameter does not change enough to cause a significant adverse affect on the operations of the process. Significant adverse effects can include process continuity problems, loss of cycle flow, or loss of cooling capacity to the extent that the reaction system must be shut down or the reaction system cannot operate economically. The measured value of a cycle cooler performance parameter may need to be corrected to a standard set of conditions for comparison purposes as the reaction system conditions change.

In one embodiment, the cycle cooler performance parameter is a heat transfer capacity of the cycle cooler, and the amount of the carboxylate metal salt introduced is controlled such that the heat transfer capacity of the cycle cooler does not decrease by more than about 10% over a period of time of operation; preferably the heat transfer capacity does not decrease by more than about 5%, and even more preferably the heat transfer capacity does not decrease by more than about 3%.

Embodiments of the invention described herein are suitable for use in any polymerization process. Polymerization processes include solution, gas phase fluid bed, slurry phase, and a high pressure process or a combination thereof. Preferred processes include gas phase fluid bed or slurry phase polymerization of one or more olefins at least one of which is ethylene or propylene. A gas phase process is particularly preferred (see for example U.S. Pat. Nos. 4,543,399, 4,588, 790, 5,028,670, 5,317,036, 5,352,749, 5,405,922, 5,436,304, 5,453,471, 5,462,999, 5,616,661 and 5,668,228 all of which are fully incorporated herein by reference). Also preferred are polymerization processes, particularly a gas phase fluid bed process, comprising a cycle fluid that comprises a gas phase and a liquid phase.

Propylene based polymers that are produced in the process of the invention include atactic polypropylene, isotactic polypropylene, and syndiotactic polypropylene. Other propylene polymers include propylene random, block or impact copolymers.

The carboxylate metal salt of the current invention can be fed in any form that delivers the material to the process cycle. The carboxylate metal salt may be fed to the process as a dry material, as a slurry in oil, or other suitable forms. Furthermore, the carboxylate metal salt may be delivered to any point in the reaction system, including directly into the bed, and any point of a cycle line. In one embodiment, the carboxylate metal salt is fed into a gas phase fluidized bed process in the cycle line upstream of the reaction vessel. In another embodiment, the carboxylate metal salt may be fed into the cycle line directly upstream of the cycle cooler. In one embodiment, the carboxylate metal salt may is fed as a single stand alone stream. In another embodiment, the carboxylate metal salt is combined with other process feedstreams, for example monomer feed, co-monomer feed, or an inert feed. In one embodiment, the carboxylate metal salt is combined with the catalyst feedstream. In another embodiment, the carboxylate metal salt is deposited on the catalyst and the combined catalyst and carboxylate metal salt is fed as a single combined feedstream.

In one embodiment, a polymerization catalyst and a carboxylate metal salt are introduced as separate streams into a reaction system that includes a reactor vessel and a cycle cooler. The polymerization catalyst reacts with at least one olefin under polymerization conditions in the reactor vessel. The heat of reaction is removed in the cycle cooler. The amount of the carboxylate metal salt introduced is controlled independently from the catalyst feed such that the cycle cooler performance parameter is substantially constant over a period of time of operation.

The carboxylate metal salt of the current invention can be introduced at anytime during the operation of the process. In one embodiment, the carboxylate metal salt is fed separately from the catalyst and is introduced anytime before, during, or after start of the polymerization reaction. Furthermore, the carboxylate metal salt of the current invention can be fed continuously or intermittently. In a preferred embodiment, the carboxylate metal salt feed is substantially continuous while the polymerization reaction is occurring.

One method of monitoring "cycle cooler fouling" is by measuring the pressure drop across the cycle cooler. It is well known that the flow of cycle gas through the cycle cooler results in a pressure drop across the cycle cooler. Thus in one embodiment, the cycle cooler performance parameter is a pressure drop across the cycle cooler at substantially similar process conditions. For the purposes of this patent specification and appended claims the term "cooler DP" refers to this pressure drop across the cycle cooler. The cooler DP is a function of many factors, such as the flow of fluid through the cycle cooler, the fluid density, the state of the fluid passing through the cycle cooler (single or two-phase), and the degree of cycle cooler fouling. To evaluate the degree of cycle cooler fouling, measurements of cooler DP can be taken at substantially similar operating conditions to that of conditions when the cycle cooler was clean. Alternately, one of ordinary skill in the art can calculate the cooler DP at substantially similar process conditions by reading the actual cooler DP measurements for the actual operating conditions and applying suitable fluid flow and physical property algorithms to determine an equivalent cooler DP at a specific condition. This allows one skilled in the art to compare readings over time to the readings taken when the cycle cooler was clean. As time passes, deposits on the cycle cooler surfaces result in increases in the cooler DP. This increase in cooler DP results in more energy required to pump the cycle fluid through the cycle cooler and eventually to a reduction in cycle flow. It was surprisingly discovered that controlling the level of carboxylate metal salt to maintain a minimum amount of carboxylate metal salt present in the process reduces or substantially eliminates the increase in cooler DP over a period of time of operation.

In one embodiment, the cycle cooler performance parameter is the pressure drop across the process side of the cycle cooler, and the carboxylate metal salt is controlled such that the pressure drop across the cycle cooler at substantially similar process conditions does not increase by more than about 100% over the pressure drop of a clean cycle cooler during a period of time of operation; preferably the pressure drop across the cycle cooler at substantially similar process conditions does not increase by more than about 50%, and even more preferably the pressure drop across the cycle cooler at substantially similar process conditions does not increase by more than about 20%.

In yet another embodiment, the carboxylate metal salt introduced is controlled such that the pressure drop across the cycle cooler is substantially constant at substantially similar process conditions over a period of time of operation that is greater than about one month, preferably greater than about one year, and more preferably about six months to about three years. In other embodiments, the pressure drop across the cycle cooler at substantially similar process conditions does not increase by more than about 100% over a period of time of operation that is greater than about one month, preferably greater than about one year, and more preferably about six months to about three years. In further embodiments, the pressure drop across the cycle cooler at substantially similar process conditions does not increase by more than about 50% over a period of time of operation that is greater than about one month, preferably greater than about one year, and more preferably about six months to about three years. In a still further embodiment, the pressure drop across the cycle cooler at substantially similar process conditions does not increase by more than about 20% over a period of time of operation that is greater than about one month, preferably greater than about one year, and more preferably about six months to about three years.

In one embodiment, the cycle cooler performance parameter is a cooler approach temperature. The cycle cooler approach temperature is another method of monitoring "cycle cooler fouling." For the purposes of this patent specification and appended claims the term "cooler approach temperature" refers to the difference between process-side outlet temperature and exchanger coolant supply temperature. As time passes, deposits on the cycle cooler surfaces result in increases in the cooler approach temperature. This increase in cooler approach temperature reflects changes in the heat transfer capacity of the cycle cooler. It was surprisingly discovered that controlling the level of carboxylate metal salt to maintain a minimum amount of carboxylate metal salt present in the process reduces or substantially eliminates the increase in cooler approach temperature over time.

In one embodiment, the carboxylate metal salt is controlled such that the cooler approach temperature at substantially similar process conditions does not increase by more than about 150% over the pressure drop of a clean cycle cooler during a period of time of operation; preferably the cooler approach temperature at substantially similar process conditions does not increase by more than about 100%, and even more preferably the cooler approach temperature at substantially similar process conditions does not increase by more than about 50%.

One embodiment of the current invention is directed to a continuous gas phase polymerization process for polymerizing ethylene and one or more alpha-olefins having 4 or more carbon atoms at a pressure in the range of from about 100 psig to about 500 psig, a polymerization temperature in the range of from about 70° C. to about 110° C., and at a polymerization catalyst productivity of greater than 1500 grams of the polymer product per gram of the polymerization catalyst, the process operating in the presence of a carboxylate metal salt, wherein the carboxylate metal salt comprises a Group 13 metal atom, and wherein the amount of carboxylate metal salt introduced is controlled such that the heat transfer capacity of the cycle cooler is substantially constant over a period of time of operation.

In various embodiments using the continuous gas phase polymerization process: the polymerization catalyst and the carboxylate metal salt are fed separately; the carboxylate metal salt is introduced to the process continuously or intermittently; the carboxylate metal salt is introduced into the reactor system at anytime before, during, or after start of the polymerization reaction; the amount of the carboxylate metal salt introduced is based on a ratio of the weight of carboxylate metal salt being fed to the weight of polymerized resin produced and is in the range of from about 1 to about 500 PPM; the amount of the carboxylate metal salt introduced is based on a ratio of the weight of carboxylate metal salt fed to weight of polymerized resin produced and is in the range of from about 1 to about 100 PPM; the amount of the carboxylate metal salt introduced is based on a ratio of the weight of carboxylate metal salt fed to weight of polymerized resin produced and is in the range of from about 1 to about 50 PPM; the amount of the carboxylate metal salt introduced is based on a weight percent of polymerization catalyst introduced and is in the range of from about 0.5 to about 100 weight percent.

In one embodiment using the continuous gas phase polymerization process, the carboxylate metal salt is controlled such that the heat transfer capacity of the cycle cooler does not decrease by more than about 10% over a period of time of operation; preferably the heat transfer capacity of the cycle cooler does not decrease by more than about 5%, and even more preferably the heat transfer capacity of the cycle cooler does not decrease by more than about 3%.

In yet another embodiment using the continuous gas phase polymerization process, the carboxylate metal salt is controlled such that the heat transfer capacity of the cycle cooler is substantially constant over a period of time of operation that is greater than about one month, preferably greater than about one year, and more preferably about six months to about three years. In other embodiments using the continuous gas phase polymerization process, the heat transfer capacity of the cycle cooler does not decrease by more than about 10% over a period of time of operation that is greater than about one month, preferably greater than about one year, and more preferably about six months to about three years. In a further embodiment using the continuous gas phase polymerization process, the heat transfer capacity of the cycle cooler does not decrease by more than about 5% over a period of time of operation that is greater than about one month, preferably greater than about one year, and more preferably about six months to about three years. In a still further embodiment using the continuous gas phase polymerization process, the heat transfer capacity of the cycle cooler does not decrease by more than about 3% over a period of time of operation that is greater than about one month, preferably greater than about one year, and more preferably about six months to about three years.

The process of this invention is also directed toward a solution, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, vinylbenzocyclobutane, styrenes, alkyl substituted styrene, ethylidene norbornene, isoprene, dicyclopentadiene and cyclopentene.

In one preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a process, particularly a gas phase or slurry phase process, for polymerizing propylene alone or with one or more other monomers including ethylene, and olefins having from 4 to 12 carbon atoms. Polypropylene polymers may be produced using particularly bridged metallocene-type catalysts as described in U.S. Pat. Nos. 5,296,434 and 5,278,264, both of which are herein incorporated by reference.

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

In one embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C.

In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060 and 5,589,555, which are fully incorporated herein by reference.

A preferred process of the invention is where the process, preferably a slurry or gas phase process is operated in the presence of a metallocene-type catalyst system and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference. However, it has been discovered that a polymerization process utilizing the catalyst system/carboxylate metal salt combination of the invention may be operated with a small amount of scavenger with reduced or no effect on process operability and catalyst performance. Thus, in one embodiment, the invention provides a process for polymerizing olefin(s) in a reactor in the presence of a metallocene-type catalyst system, a carboxylate metal salt and a scavenger.

In one embodiment, the polymerization catalyst and/or catalyst composition, the polymerization catalyst and the carboxylate metal salt have a productivity greater than 1500 grams of polymer per gram of catalyst, preferably greater than 2000 grams of polymer per gram of catalyst, more preferably greater than 2500 grams of polymer per gram of catalyst and most preferably greater than 3000 grams of polymer per gram of catalyst.

In another embodiment, the polymerization catalyst and/or catalyst composition, the polymerization catalyst and the carboxylate metal salt, have a productivity greater than 2000 grams of polymer per gram of catalyst, preferably greater than 3000 grams of polymer per gram of catalyst, more preferably greater than 4000 grams of polymer per gram of catalyst and most preferably greater than 5000 grams of polymer per gram of catalyst.

In one embodiment, the polymerization catalyst and/or the catalyst composition has a reactivity ratio generally less than 2, more typically less than 1. Reactivity ratio is defined to be the mole ratio of comonomer to monomer entering the reactor, for example as measured in the gas composition in a gas phase process, divided by the mole ratio of the comonomer to monomer in the polymer product being produced. In a preferred embodiment, the reactivity ratio is less than 0.6, more preferably less than 0.4, and most preferably less than 0.3. In the most preferred embodiment, the monomer is ethylene and the comonomer is an olefin having 3 or more carbon atoms, more preferably an alpha-olefin having 4 or more carbon atoms, and most preferably an alpha-olefin selected from the group consisting of butene-1, 4-methyl-pentene-1, pentene-1, hexene-1 and octene-1.

The polymers produced by the process of the invention can be used in a wide variety of products and end-use applications. The polymers produced by the process of the invention include linear low density polyethylene, elastomers, plastomers, high density polyethylenes, low density polyethylenes, polypropylene and polypropylene copolymers.

Preferred embodiments of the present invention have a melt index (MI) or ($I_2$) as measured by ASTM-D-1238-E in the range from 0.1 dg/min to 1000 dg/min, more preferably from about 0.1 dg/min to about 100 dg/min, even more preferably from about 0.1 dg/min to about 50 dg/min, and most preferably from about 0.1 dg/min to about 10 dg/min.

The polymers of the invention in another embodiment have a melt index ratio ($I_{21}/I_2$) ($I_{21}$ is measured by ASTM-D-1238-F) of from 10 to less than 25, more preferably from about 15 to less than 25.

The polymers of the invention in one embodiment have a melt index ratio ($I_{21}/I_2$) of from preferably greater than 25, more preferably greater than 30, even more preferably greater that 40, still even more preferably greater than 50 and most preferably greater than 65.

Other embodiments of the current invention include polymers having a melt index ratio ($I_{21}/I_2$) greater than about 35 and a density of greater than about 0.910 g/cc.

Still other embodiments of the current invention include polymers having an $I_2$ melt index in the range from about 0.1 dg/min to 100 dg/min and a density greater than about 0.910 g/cc.

Yet other embodiments of the current invention include polymers having an $I_2$ melt index in the range from about 0.1 dg/min to 100 dg/min and a density greater than about 0.925 g/cc.

Catalyst Components and Catalyst Systems

Any polymerization catalyst compatible with the carboxylate metal salt selected are suitable for use in the polymerizing process of the invention. Preferred catalysts and catalyst/carboxylate metal salt combinations are discussed in detail in U.S. Pat. Nos. 6,608,153 and 6,680,276, both of which are fully incorporated by reference. Processes using metallocene-type catalysts or conventional transition metal catalysts are preferred.

Conventional Transition Metal Catalysts

Conventional transition metal catalysts are those traditional Ziegler-Natta catalysts and Phillips-type chromium catalyst well known in the art. Examples of conventional transition metal catalysts are discussed in U.S. Pat. Nos. 4,115,639, 4,077,904 4,482,687, 4,564,605, 4,721,763, 4,879,359 and 4,960,741 all of which are herein fully incorporated by reference. The conventional transition metal catalyst compounds that may be used in the present invention include transition metal compounds from Groups III to VIII, preferably IVB to VIB of the Periodic Table of Elements.

Still other conventional transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436, which are all herein incorporated by reference.

Other catalysts may include cationic catalysts such as $AlCl_3$, vanadium, constrained-geometry catalysts, cobalt, and iron catalysts, all being well known in the art.

Metallocene Catalyst Compounds

Metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, metallocene catalysts compounds useful in the invention include metallocene compounds described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

It is within the scope of this invention, in one embodiment, that the metallocene catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414-6415 and Johnson, et al., "Copolymerization of Ethylene and Propylene with Functionalized Vinyl Monomers by Palladium(II) Catalysts", J. Am. Chem. Soc., 1996, 118, 267-268, and WO 96/23010 published Aug. 1, 1996, WO 99/02472, U.S. Pat. Nos. 5,852,145, 5,866,663 and 5,880, 241, which are all herein fully incorporated by reference. These complexes can be either dialkyl ether adducts, or alkylated reaction products of the described dihalide complexes that can be activated to a cationic state by the activators of this invention described below.

Also included as metallocene catalyst are those diimine based ligands of Group 8 to 10 metal compounds disclosed in PCT publications WO 96/23010 and WO 97/48735 and Gibson, et. al., Chem. Comm., pp. 849-850 (1998), all of which are herein incorporated by reference.

Other metallocene catalysts are those Group 5 and 6 metal imido complexes described in EP-A2-0 816 384 and U.S. Pat. No. 5,851,945, which is incorporated herein by reference. In addition, metallocene catalysts include bridged bis(arylamido) Group 4 compounds described by D. H. McConville, et al., in Organometallics 1195, 14, 5478-5480, which is herein incorporated by reference. In addition, bridged bis(amido) catalyst compounds are described in WO 96/27439, which is herein incorporated by reference. Other metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is herein incorporated herein by reference. Still another metallocene catalysts include those multinuclear metallocene catalysts as described in WO 99/20665, which is incorporated herein by reference.

It is also contemplated that in one embodiment, the metallocene catalysts of the invention described above include their structural or optical or enantiomeric isomers (meso and racemic isomers, for example see U.S. Pat. No. 5,852,143, incorporated herein by reference) and mixtures thereof.

EXAMPLE

Surprisingly, it has been found that carboxylate metal salt affects the loss of heat transfer capability or pluggage of the cycle cooler. One Unipol™ Polyethylene gas phase commercial reactor with a rated annual capacity of 970 million pounds per year ran for nearly three years without a cooler change or cleaning with a mixed gradeslate of titanium based conventional transition metal catalyst (Ziegler-type catalyst utilizing $MgCl_2$ and $TiCl_3$ on silica) and metallocene catalyst with carboxylate metal salt. The cycle cooler was a conventional design Unipol shell and tube cooler vertically mounted external to the reactor vessel with carbon steel tubes.

During a time period of about three years of substantially constant cooler approach temperature shown in FIG. 1, the reaction system was operated on metallocene catalysts with a carboxylate metal salt deposited on the catalysts and with conventional Ziegler-type catalysts M Ops without the metal salt ((noted as M and E Ops on FIG. 1). The carboxylate metal salt (Witco Aluminum Distearate #22 AlSt2OH which also contains 3.3% stearic acid) was deposited on the metallocene catalyst at a level of about 2.9 wt % of the total catalyst/metal salt feedstream during the period of substantially constant cooler approach temperature. The polymer loading (weight of carboxylate metal salt fed to weight of polymerized resin produced) was about 4.0 ppm.

The commercial reactor of this example encountered little cooler fouling until the level of carboxylate metal salt in the metallocene catalyst was reduced to a level of about 1.45 wt % of the catalyst feed or 1.5 ppm polymer load. After the reduction in carboxylate metal salt level, the cycle gas cooler began to foul steadily. After about two weeks, indications of significant production limitations were evident. FIG. 2 is a plot showing the loss in production rate due to a loss of heat transfer capacity after the amount of carboxylate metal salt was reduced. FIG. 2 also shows the increase in cooler approach temperature over the same time period, reflecting the loss of heat transfer capacity in the cycle cooler. Comparing to FIG. 1, wherein the cooler approach temperature was substantially constant for about three years, one can see the significant loss in heat transfer capacity that occurred after the reduction of carboxylate metal salt. The data on the far right (July-August 2005) of FIG. 1 also shows the dramatic increase in cooler approach temperature when the feed of carboxylate metal salt was reduced.

While the present invention has been described and illustrated by reference to particular embodiments, those of ordinary skill in the art will appreciate that the invention lends itself to variations not necessarily illustrated herein. For example, it is contemplated that other carboxylate metal salts other than those discusses herein may be suitable to achieve the desired results. It is also contemplated that the process of the invention may be used in a series reactor polymerization process. For example, resin may be polymerized in a first reaction system free of a carboxylate metal salt with a carboxylate metal salt being fed to a second reaction system or vice-versa. It is even further contemplated that the components of a carboxylate metal salt, a carboxylic acid and metal compound, for example a metal hydroxy compound, may be added to the reactor or the polymerization catalyst to form in situ the reactor or with the catalyst. It is also contemplated that a carboxylate metal salt may be separately delivered in a variety of methods, including being supported on a carrier different from the polymerization catalyst. Furthermore, other equipment may benefit from reduced fouling by feeding a carboxylate metal sale. For instance, cycle piping and cycle compressors or pumps may exhibit reduced fouling while feeding a carboxylate metal salt. Therefore, the spirit and scope of the appended claims should not be limited to the description of the preferred versions contained herein.

What is claimed is:

1. A process for maintaining heat transfer capacity of a cycle cooler while polymerizing olefin(s) in the presence of catalyst, the process comprising the steps of:
    (a) introducing a polymerization catalyst and a carboxylate metal salt comprising a Group 13 metal atom into a reaction system, the reaction system comprising a reactor vessel and a cycle cooler;
    (b) reacting at least one olefin with the polymerization catalyst under polymerization conditions in the reactor vessel;
    (c) transferring a heat of reaction to a cycle fluid;
    (d) removing at least a portion of the heat of reaction from the cycle fluid in the cycle cooler; and
    (e) controlling the amount of the carboxylate metal salt introduced such that a cycle cooler performance parameter is substantially constant over a period of time of operation, wherein the cycle cooler performance parameter is selected from the group consisting of a heat transfer capacity of the cycle cooler, a pressure drop across the cycle cooler at substantially similar conditions, and a cooler approach temperature.

2. The process of a claim 1, wherein the carboxylate metal salt is represented by the formula $MQ_x(OOCR)_y$ where M is a Group 13 metal atom; Q is halogen, or a hydroxy, alkyl, alkoxy, aryloxy, siloxy, silane or sulfonate group; R is a hydrocarbyl radical having from 2 to 100 carbon atoms; x is an integer from 0 to 3; y is an integer from 1 to 4; and the sum of x and y is equal to the valence of the metal M.

3. The process of claim 2, wherein Q is halogen or a hydroxy group; and R is a hydrocarbyl radical having from 4 to 24 carbon atoms.

4. The process of claim 2, wherein y is either 1, 2 or 3, Q is a hydroxy group, and R is a hydrocarbyl radical having greater than 12 carbon atoms.

5. The process of claim 1, wherein the carboxylate metal salt is selected from the group consisting of aluminum monostearate, aluminum di-stearate and aluminum tri-stearate or a combination thereof.

6. The process of claim 1, wherein the amount of the carboxylate metal salt introduced is a ratio of the weight of carboxylate metal salt fed to the weight of polymerized resin produced and is in the range of from about 1 to about 500 PPM.

7. The process of claim 6, wherein the ratio of weight is in the range of from about 1 to about 100 PPM.

8. The process of claim 7, wherein the ratio of weight is in the range of from about 1 to about 50 PPM.

9. The process of claim 1, wherein the amount of the carboxylate metal salt introduced is a weight percent of polymerization catalyst introduced and is in the range of from about 0.5 to about 100 weight percent.

10. The process of claim 1, wherein the carboxylate metal salt and polymerization catalyst are introduced as a mixture.

11. The process of claim 1, wherein the period of time of operation is greater than about one month.

12. The process of claim 1, wherein the period of time of operation is greater than about one year.

13. The process of claim 1, wherein the period of time of operation is about six months to about three years.

14. The process of claim 1, wherein the cycle cooler performance parameter is the heat transfer capacity of the cycle cooler and wherein the heat transfer capacity of the cycle cooler does not decrease by more than about 10%.

15. The process of claim 14, wherein the heat transfer capacity of the cycle cooler does not decrease by more than about 5%.

16. The process of claim 14, wherein the heat transfer capacity of the cycle cooler does not decrease by more than about 3%.

17. The process of claim 1, wherein the cycle cooler performance parameter is the pressure drop across the cycle cooler at substantially similar conditions and wherein the pressure drop across the cycle cooler at substantially similar conditions does not increase by more than about 100%.

18. The process of claim 17, wherein the pressure drop across the cycle cooler at substantially similar conditions does not increase by more than about 50%.

19. The process of claim 17, wherein the pressure drop across the cycle cooler at substantially similar conditions does not increase by more than about 20%.

20. The process of claim 1, wherein the cycle cooler performance parameter is the cooler approach temperature and wherein the cooler approach temperature does not increase by more than about 150%.

21. The process of claim 20, wherein the cooler approach temperature does not increase by more than about 100%.

22. The process of claim 20, wherein the cooler approach temperature does not increase by more than about 50%.

23. The process of claim 1, wherein the process is producing polyethylene polymer.

24. The process of claim 1, wherein the process is producing polypropylene polymer.

25. The process of claim 1, wherein the reaction system comprises a gas phase fluid bed reactor.

26. The process of claim 1, wherein the reaction system comprises a slurry phase reactor.

27. The process of claim 1, wherein the polymerization catalyst comprises a conventional transition metal catalyst compound.

28. The process of claim 1, wherein the polymerization catalyst comprises a metallocene catalyst compound.

29. A process for maintaining heat transfer capacity of a cycle cooler while polymerizing olefin(s) in the presence of catalyst, the process comprising the steps of:
(a) introducing a polymerization catalyst into a reaction system, the reaction system comprising a reactor vessel and a cycle cooler;
(b) introducing a carboxylate metal salt into the reaction system separately from the polymerization catalyst, wherein the carboxylate metal salt comprises a Group 13 metal atom;
(c) reacting at least one olefin with the polymerization catalyst under polymerization conditions in the reactor vessel;
(d) transferring a heat of reaction to a cycle fluid;
(e) removing at least a portion of the heat of reaction from the cycle fluid in the cycle cooler; and
(f) controlling the amount of the carboxylate metal salt introduced such that a cycle cooler performance parameter is substantially constant over a period of time of operation, wherein the cycle cooler performance parameter is selected from the group consisting of a heat transfer capacity of the cycle cooler, a pressure drop across the cycle cooler at substantially similar conditions, and a cooler approach temperature.

30. The process of a claim 29, wherein the carboxylate metal salt is represented by the formula: $MQ_x(OOCR)_y$ where M is a Group 13 metal atom; Q is halogen, or a hydroxy, alkyl, alkoxy, aryloxy, siloxy, silane or sulfonate group; R is a hydrocarbyl radical having from 2 to 100 carbon atoms; x is an integer from 0 to 3; y is an integer from 1 to 4; and the sum of x and y is equal to the valence of the metal M.

31. The process of claim 30, wherein Q is halogen or a hydroxy group; and R is a hydrocarbyl radical having from 4 to 24 carbon atoms.

32. The process of claim 31, wherein y is either 1, 2, or 3, Q is a hydroxy group, and R is a hydrocarbyl radical having greater than 12 carbon atoms.

33. The process of claim 29, wherein the carboxylate metal salt is selected from the group consisting of aluminum mono-stearate, aluminum di-stearate and aluminum tri-stearate or a combination thereof.

34. The process of claim 33, wherein the carboxylate metal salt is combined with a fatty amine antistatic agent.

35. The process of claim 34, wherein the antistatic agent is selected from the group consisting of a blend of ethoxylated stearyl amine and zinc stearate, and a blend of ethoxylated stearyl amine, zinc stearate and octadecyl-3,5-di-tert-butyl-4-hydroxyhydrocinnamate.

36. The process of claim 29, wherein the amount of the carboxylate metal salt introduced is a ratio of the weight of carboxylate metal salt fed to weight of polymerized resin produced and is in the range of from about 1 to about 500 PPM.

37. The process of claim 36, wherein the ratio of weight is in the range of from about 1 to about 100 PPM.

38. The process of claim 37, wherein the ratio of weight is in the range of from about 1 to about 50 PPM.

39. The process of claim 29, wherein the amount of the carboxylate metal salt introduced is a weight percent of polymerization catalyst introduced and is in the range of from about 0.5 to about 100 weight percent.

40. The process of claim 29, wherein the period of time of operation is greater than about one month.

41. The process of claim 29, wherein the period of time of operation is greater than about one year.

42. The process of claim 29, wherein the period of time of operation is about six months to about three years.

43. The process of claim 29, wherein the cycle cooler performance parameter is the heat transfer capacity of the cycle cooler and wherein the heat transfer capacity of the cycle cooler does not decrease by more than about 10%.

44. The process of claim 43, wherein the heat transfer capacity of the cycle cooler does not decrease by more than about 5%.

45. The process of claim 43, wherein the heat transfer capacity of the cycle cooler does not decrease by more than about 3%.

46. The process of claim 29, wherein the cycle cooler performance parameter is the pressure drop across the cycle cooler at substantially similar conditions and wherein the pressure drop across the cycle cooler at substantially similar conditions does not increase by more than about 100%.

47. The process of claim 46, wherein the pressure drop across the cycle cooler at substantially similar conditions does not increase by more than about 50%.

48. The process of claim 46, wherein the pressure drop across the cycle cooler at substantially similar conditions does not increase by more than about 20%.

49. The process of claim 29, wherein the cycle cooler performance parameter is the cooler approach temperature and wherein the cooler approach temperature does not increase by more than about 150%.

50. The process of claim 49, wherein the cooler approach temperature does not increase by more than about 100%.

51. The process of claim 49, wherein the cooler approach temperature does not increase by more than about 50%.

52. The process of claim 29, wherein the process is producing polyethylene polymer.

53. The process of claim 29, wherein the process is producing polypropylene polymer.

54. The process of claim 29, wherein the reaction system comprises a gas phase fluid bed reactor.

55. The process of claim 29, wherein the reaction system comprises a slurry phase reactor.

56. The process of claim 29, wherein the polymerization catalyst comprises a conventional transition metal catalyst compound.

57. The process of claim 29, wherein the polymerization catalyst comprises a metallocene catalyst compound.

58. The process of claim 29, wherein the carboxylate metal salt is introduced into the reactor system at anytime before, during, or after start of the polymerization reaction.

59. The process of claim 29, wherein the carboxylate metal salt is introduced to the process continuously or intermittently.

60. A continuous gas phase polymerization process for polymerizing ethylene and one or more alpha-olefins having 4 or more carbon atoms, wherein the polymerization process takes place in a reaction system comprising a reactor vessel and a cycle color and wherein the process takes place at a pressure in the range of from about 100 psig to about 500 psig, a polymerization temperature in the range of from about 30° C. to about 120° C., and at a polymerization catalyst productivity of greater than 1000 grams of the polymer product per gram of the polymerization catalyst, the process operating in the presence of a carboxylate metal salt, wherein the carboxylate metal salt comprises a Group 13 metal atom, and wherein the amount of carboxylate metal salt introduced is controlled such that a heat transfer capacity of the cycle cooler is substantially constant over a period of time of operation.

61. The process of claim 60, wherein the polymerization catalyst and the carboxylate metal salt are fed separately.

62. The process of claim 61, wherein the carboxylate metal salt is introduced to the process continuously or intermittently.

63. The process of claim 61, wherein the carboxylate metal salt is introduced into the reactor system at anytime before, during, or after start of the polymerization reaction.

64. The process of a claim 60, wherein the carboxylate metal salt is represented by the formula $MQ_x(OOCR)_y$, where M is a Group 13 metal atom; Q is a halogen, or a hydroxy group; R is a hydrocarbyl radical having from 2 to 24 carbon atoms; x is an integer from 0 to 3; y is an integer from 1 to 4; and the sum of x and y is equal to the valence of the metal M.

65. The process of claim 64, wherein y is 1, 2, or 3, Q is a hydroxy group, and R is a hydrocarbyl radical having greater than 12 carbon atoms.

66. The process of claim 60, wherein the carboxylate metal salt is selected from the group consisting of aluminum monostearate, aluminum di-stearate and aluminum tri-stearate or a combination thereof.

67. The process of claim 60, wherein the amount of the carboxylate metal salt introduced is a ratio of the weight of carboxylate metal salt fed to weight of polymerized resin produced and is in the range of from about 1 to about 500 PPM.

68. The process of claim 67, wherein the ratio of weight is in the range of from about 1 to about 100 PPM.

69. The process of claim 68, wherein the ratio of weight is in the range of from about 1 to about 50 PPM.

70. The process of claim 60, wherein the amount of the carboxylate metal salt introduced is based on a weight percent of polymerization catalyst introduced and is in the range of from about 0.5 to about 100 weight percent.

71. The process of claim 60, wherein the period of time of operation is greater than about one month.

72. The process of claim 60, wherein the period of time of operation is greater than about one year.

73. The process of claim 60, wherein the period of time of operation is about six months to about three years.

74. The process of claim 60, wherein the heat transfer capacity of the cycle cooler does not decrease by more than about 10%.

75. The process of claim 60, wherein the heat transfer capacity of the cycle cooler does not decrease by more than about 5%.

76. The process of claim 60, wherein the heat transfer capacity of the cycle cooler does not decrease by more than about 3%.

77. The process of claim 60, wherein the polymerization catalyst productivity is greater than about 3000 grams of the polymer product per gram of the polymerization catalyst, and wherein the polymerization catalyst is a bridged, metallocene catalyst compound, and the process is producing greater than about 25,000 pounds of a polymer product per hour.

78. The process of claim 60, wherein the process is producing a polymer product having a density greater than about 0.920 g/cc.

79. The process of claim 78, wherein the process is producing a polymer having an $I_{21}/I_2$ melt index ratio of greater than 30.

80. The process of claim 60, wherein the polymer product has an $I_{21}/I_2$ melt index ratio of greater than about 35 and density greater than about 0.910 g/cc.

81. The process of claim 60, wherein the process is producing a polymer product having an $I_2$ melt index in the range from about 0.1 dg/min to 1000 dg/min.

82. The process of claim 81, wherein the process is producing a polymer product having an $I_2$ melt index in the range from about 0.1 dg/min to 100 dg/min.

83. The process of claim 82, wherein the process is producing a polymer product having a density greater than about 0.910 g/cc.

84. The process of claim 82, wherein the process is producing a polymer product having a density greater than about 0.925 g/cc.

85. The process of claim 81, wherein the process is producing a polymer product having an $I_2$ melt index in the range from about 0.1 dg/min to 50 dg/min.

86. The process of claim 85, wherein the process is producing a polymer product having an $I_2$ melt index in the range from about 0.1 dg/min to 10 dg/min.

* * * * *